Patented Aug. 21, 1945

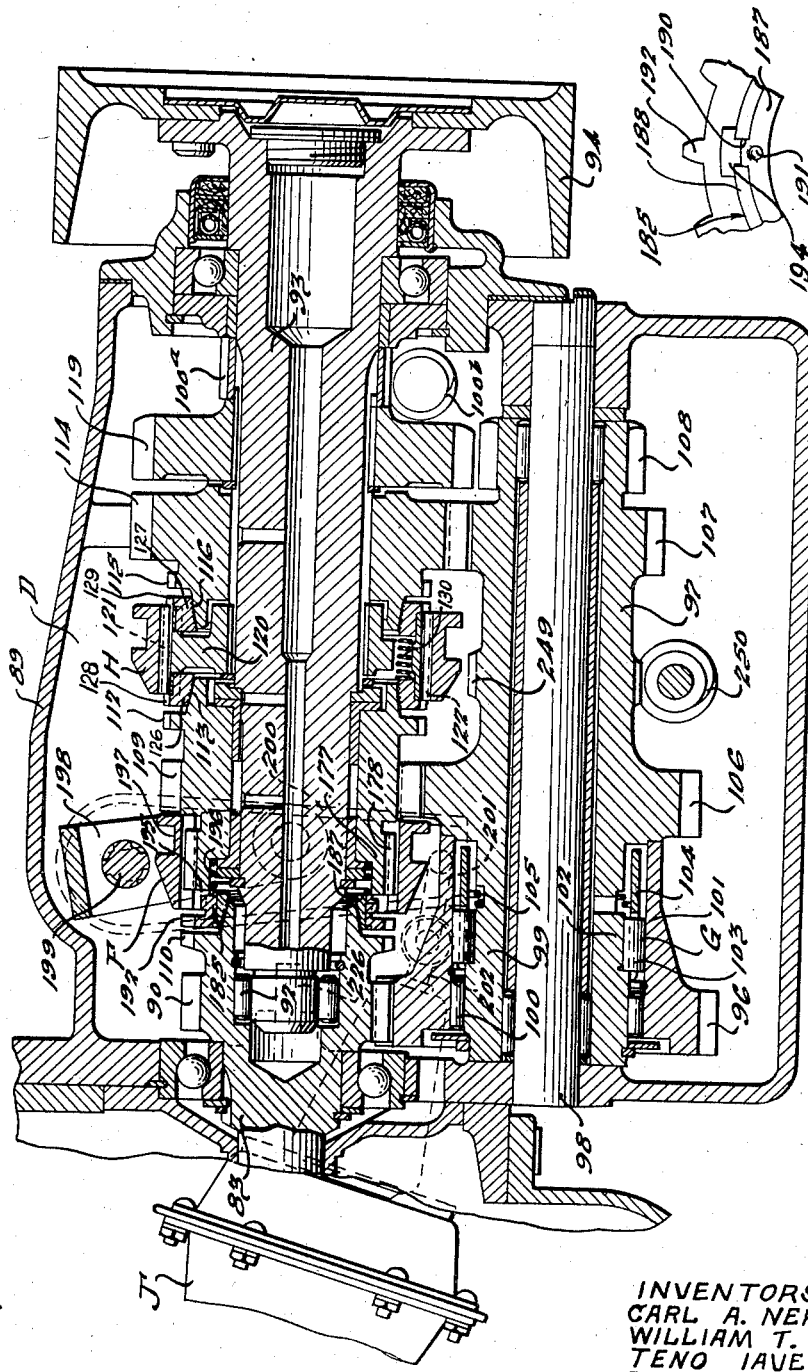

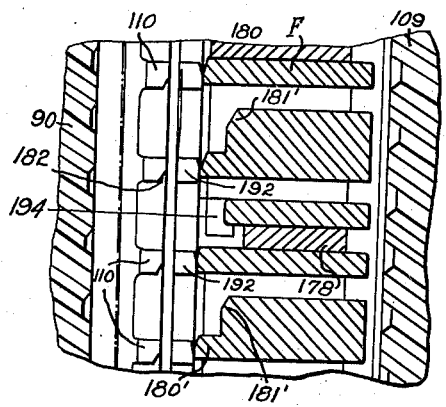
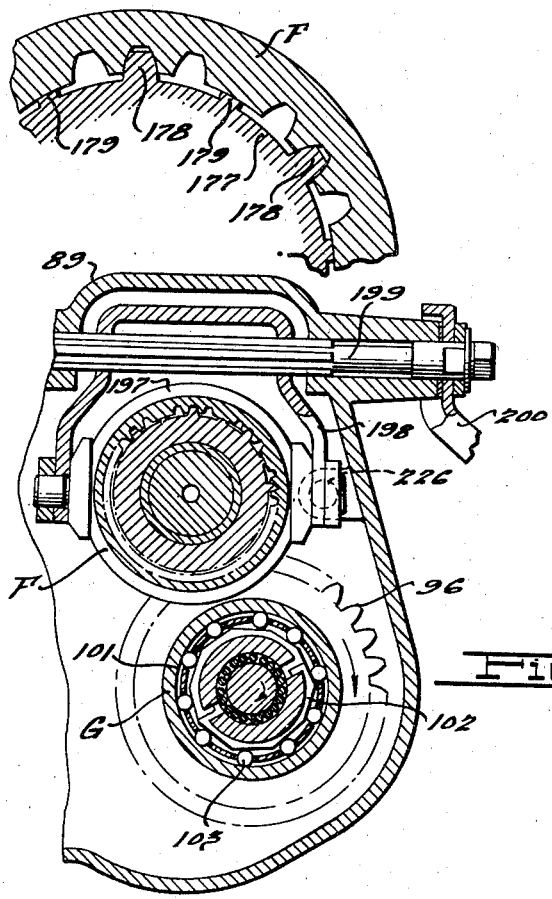

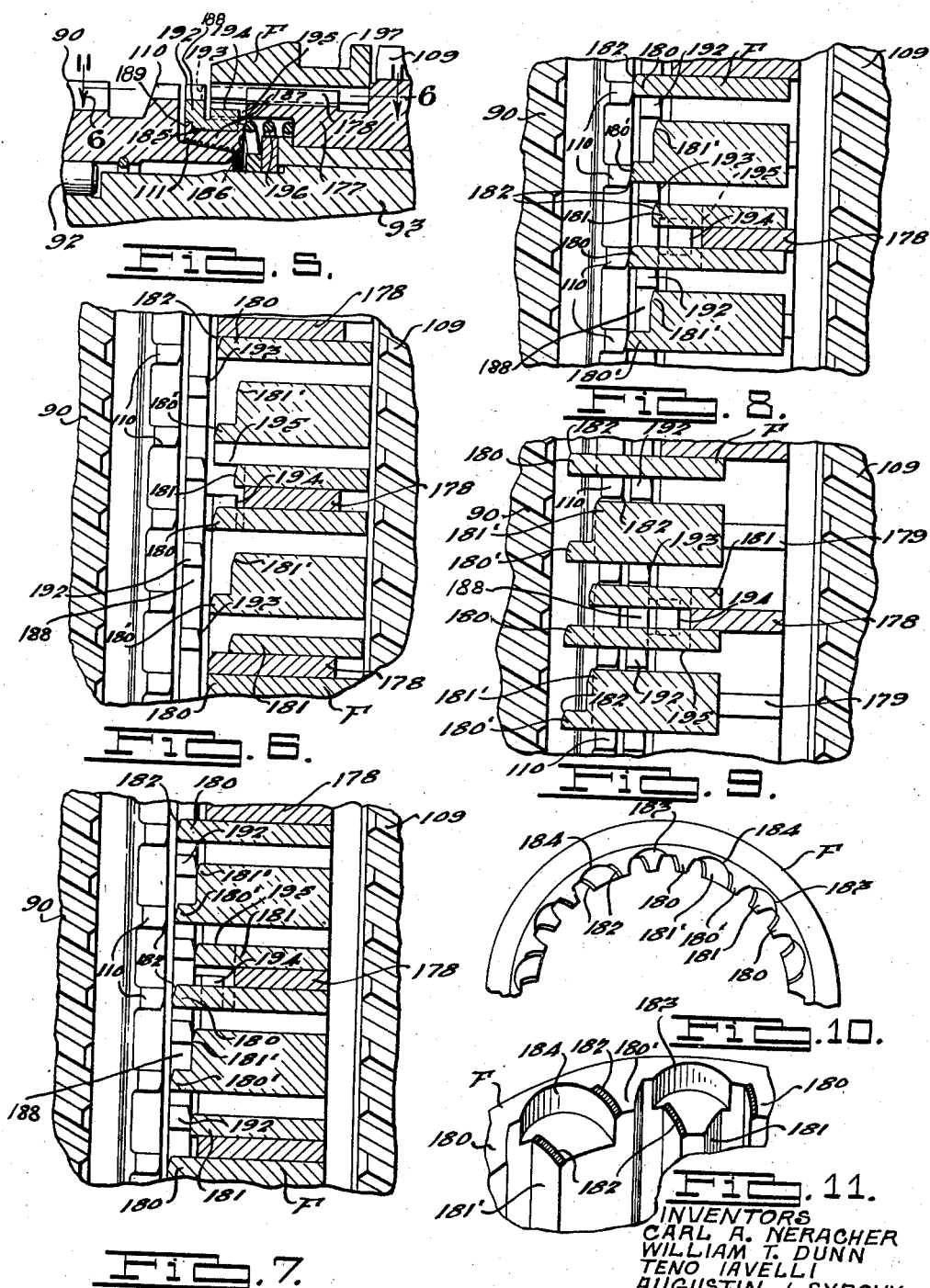

2,383,149

UNITED STATES PATENT OFFICE 2,383,149

POWER TRANSMISSION

Carl A. Neracher, William T. Dunn, Teno Iavelli, and Augustin J. Syrovy, Detroit, Mich., assignors to Chrysler Corporation, Highland Park, Mich., a corporation of Delaware Original application May 15, 1940, Serial No. 335,310. Divided and this application June 17, 1941, Serial No. 398,453

5 Claims. (Cl. 192—53)

This invention relates to power transmissions and refers more particularly to improved driving systems for motor vehicles.

This application is a division of our copending application Serial No. 335,310 filed May 15, 1940.

It is an object of our invention to provide a transmission system affording improved characteristics of change speed control with a comparatively simple mechanism capable of long life.

Another object of our invention is to provide a transmission affording improved means for changing speed ratios through the medium of positively engaging clutch means having synchronous control for ensuring clutching without shock or ratcheting noise.

A further object is to provide improved synchronous clutching means which will automatically respond to blocking and unblocking control in response to relationship between relative speeds of the parts to be clutched and in response to drive and coast of the driving part relative to the driven part. More particularly, our invention provides an improved blocker clutching arrangement which, while the shiftable jaw clutching member is being biased toward clutching engagement with the companion jaw clutching member, will prevent engagement between the teeth of the jaw clutch members when these members are asynchronous and also when the driving member is accelerated from a speed less than that of the driven member to and above the speed of the driven member while automatically effecting clutching between the teeth of the jaw clutch members when the driving member is decelerated from a speed greater than that of the driven member to the speed of the driven member thereby preventing the driving member from dropping below the speed of the driven member. This arrangement provides what may be termed clutch blocking during drive and clutching engagement or unblocking during coast and insures against clutching action taking place under application of engine drive torque although accommodating clutching action during coast of the engine, such action protecting the parts of the entire drive, preventing lurching, effecting smooth clutching action, and delaying the clutching until engine coast is effected.

Additional features of our invention are found in the provision of many features of improved construction and functional operation which will be more apparent from the following illustrative embodiments of the principles of our invention, reference being had to the accompanying drawings in which:

Fig. 1 is a sectional elevational view through the speed ratio changing transmission illustrating our clutching mechanism.

Fig. 2 is a fragmentary view of a portion of the blocker ring.

Fig. 3 is a sectional view transversely through the Fig. 1 transmission.

Fig. 4 is an enlarged view of a portion of the automatic shift sleeve as seen in Fig. 3.

Fig. 5 is a detailed enlarged view of the synchronous blocker clutch or coupling mechanism as seen in Fig. 1.

Fig. 6 is a sectional plan view illustrated as a development according to line 6—6 of Fig. 5, the automatic clutching sleeve being released.

Fig. 7 is a similar view showing the automatic clutching sleeve in its intermediate blocked position during the drive blocking condition.

Fig. 8 is a similar view showing the automatic clutching sleeve in its coasting relationship from the Fig. 7 showing, the clutching sleeve being unblocked during coast for its clutching movement.

Fig. 9 is a similar view showing the automatic clutching sleeve in full clutching engagement.

Fig. 10 is an elevational view of a portion of the clutching end of the automatic clutching sleeve.

Fig. 11 is a fragmentary perspective view showing a typical portion of the Fig. 10 sleeve teeth.

Fig. 12 is a view similar to Fig. 6 showing the automatic clutching sleeve in its other intermediate blocked position during coast blocking condition.

We have illustrated the principles of our invention in connection with a motor vehicle drive wherein the usual engine transmits its drive through suitable clutching means, the drive then passing through the change speed transmission D and thence through the usual propeller shaft and differential to the vehicle ground wheels where it is desired to drive the rear wheels according to present day practice.

We preferably transmit the drive from the engine to transmission D through clutch means comprising a fluid coupling of the kinetic type preferably in conjunction with a releasable clutch of a conventional design primarily employed to facilitate manual shifts in transmission D.

Shaft 83, which receives the drive from the engine, extends rearwardly into the housing or casing 89 of transmission D (Fig. 1) where it is formed with a main drive pinion 90. The drive pinion 90 is hollow and journals, by a bearing 92, the forward end of the transmission driven shaft 93 which may carry a propeller shaft brake drum 94. The drive pinion 90 is continuously meshed with a gear 96 for driving the countershaft cluster 97 rotatable on a countershaft support 98. The cluster 97 has a forward extension 99 journalled at 100 within gear 96 and between these parts 99 and 96 there is provided an overrunning clutch G (Figs. 1 and 3). The usual speedometer drive gears are shown at 100ª fixed to shaft 93 and 100ᵇ for driving the usual speedometer cable.

The clutch G comprises a driving cylinder clutching member 101 formed within gear 96, and an inner driven cammed member 102 formed on extension 99. Rollers 103 are disposed between clutch members 101 and 102 such that these rollers are wedged to clutch these members together when the gear 96 tends to rotate faster than extension 99 in the direction of forward drive of the car while allowing the extension 99 to freely overrun gear 96. Assuming the usual clockwise direction of driving shaft 83, when looking from the front to the rear, then clutch G engages when, as viewed in Fig. 3, the gear 96 tends to rotate clockwise faster than extension 99. A cage 104 positions the rollers 103 in proper spacing, a spring 105 yieldingly urging the rollers in the direction of their engagement as is customary in overrunning clutches.

The cluster 97 is further formed with reduction gears 106, 107 and reverse gear 108, these three countershaft gears being of relatively decreasing diameter in the order mentioned. Gear 106 is in constant mesh with a gear 109 which is freely journalled on driven shaft 93. The gear 109 has a forward extension carrying a set of external driven teeth slidably fitting internal clutch teeth of the synchronous coupling sleeve F so that this sleeve is, as will be presently more apparent, adapted to turn with transmission output or driven shaft 93 but may slide forwardly from its Fig. 1 position relatively to the driven shaft. Gear 109 has a rearward extension formed with a set of clutch teeth 112 and a friction cone clutch member 113 and drive pinion 90 also has a rearward extension formed with a set of external clutch teeth 110 and a friction cone clutch member 111.

The gear 107 is constantly meshed with a low speed gear 114 freely journaled on driven shaft 93 and having a forward extension formed with clutch teeth 115 and cone clutch member 116. The reverse gear 108 is adapted to mesh with a reverse idler gear (not shown) when the latter is slid forwardly on its countershaft. At such time the idler also meshes with a gear 119 fixed on the driven shaft 93.

The arrangement is such that shaft 93 may be selectively clutched at the will of the driver with gears 114 and 109, the control preferably comprising a manual remote shift of any suitable type and construction. The operation of clutch sleeve F is, on the other hand, automatic in its operation of clutching the driving shaft 83 with gear 109 and for disconnecting these parts. The manual clutching control comprises the following mechanism.

Fixed to driven shaft 93 is a hub 120 formed with external teeth 121 slidably engaged with the internal teeth 122 of the manually shiftable clutch sleeve H adapted for forward and rearward shift.

Synchronizing blocker rings 126, 127 are respectively disposed between gears 109, 114 and hub 120 and are driven with hub 120 with slight rotative clearance. These blockers have cammed teeth 128, 129 having a pitch circle the same as that of sleeve teeth 122 and teeth 112 and 115 and they are adapted to frictionally engage the clutching members 113 and 116 respectively. If desired, energizing springs 130 may be provided between the blockers to lightly urge them into engagement with cones 113 and 116 respectively so that the blocker teeth 128, 129 are misaligned with the sleeve teeth 122 thereby preventing shift of sleeve H as long as the parts to be clutched are rotating at different speeds. The synchronizing blocker rings are more fully described and claimed in the copending application of O. E. Fishburn, Serial No. 180,840, filed December 20, 1937, now Patent No. 2,333,165, and, if desired, any commercial well-known type of blocker synchronizers may be employed to control shift of sleeve H.

When sleeve H is moved forwardly, teeth 122 engage the cammed ends of blocker teeth 128 thereby urging the blocker under pressure engagement with cone 113 to synchronize gear 109 with shaft 93 (the main clutch being released during manual shift of sleeve H to facilitate the clutching action). Then the blocker 126 will rotate slightly relative to hub 120 to permit the sleeve teeth 122 to pass through blocker teeth 128 to engage teeth 112 to positively clutch shaft 93 with gear 109. The rearward shift of sleeve H to clutch with teeth 115 of gear 114 is synchronously effected under control of blocker 127 in the same manner.

Blocking means is provided to limit forward shift of clutch sleeve F whenever shaft 83 and gear 109 are rotating at different speeds, the blocking action being such that the sleeve F will clutch only when the engine is coasting. The details of the blocking means is best shown in Figs. 4–12, the arrangement providing improved and simplified blocker action.

The forwardly projecting end 177 of gear 109 is externally toothed at 178, there being spaces of triple-tooth width between the successive driven teeth 178 (Fig. 4) provided mid-way across the spaces with pilot lands or ribs 179. The clutch sleeve F has internal teeth preferably formed in a repeating pattern best shown in Fig. 6–12. The teeth are formed so that every other tooth of the series extends forwardly axially beyond the teeth adjacent thereto so that, for convenience of reference, the teeth may be said to be relatively long or relatively short although obviously the rear ends of the teeth need not be circumferentially aligned as these rear ends have nothing to do with the clutching action. Therefore the reference herein to relatively long or short teeth has reference to the clutching ends of the teeth of sleeve F and not necessarily the relative total axial lengths of the teeth which may be relatively varied as desired.

In addition to providing the repeating pattern of alternate long and short teeth, at least one adjacent pair of these teeth are circumferentially connected or bridged together such that the space which would normally occur between these bridged teeth is closed against passage of the clutching teeth 110 therebetween. This arrangement protects the teeth from damage during clutching and also insures clutching free from jolts and shocks to the car occupants as well as to the transmission mechanism as will presently be more apparent. In actual practice, for symmetry of balance and machining, the bridged teeth preferably occur at repeating intervals circumferentially such that between each pair of bridged long and short teeth is a pair of normally spaced or disconnected long and short teeth.

In the drawings the disconnected pairs of long and short teeth 180, 181 respectively, are so spaced that between each of these pairs of teeth there is a pair of the bridged long and short teeth 180' and 181'. The bridged teeth are identical with teeth 180 and 181 except that the space between the latter is occupied by the connecting or bridging portions of the body of sleeve F. The leading edges of the rear ends of teeth 110 and the trailing edges of the forward ends of long teeth 180, 180' and short teeth 181, 181' are chamfered or bevelled at 182 to facilitate their clutching and we have found that approximately 15° chamfer angle is satisfactory.

As an improvement in the manufacture of the sleeve F we form the teeth just as shown in Fig. 6 except that all teeth terminate in a common plane at their front ends (as viewed in Fig. 6) and without any chamfer. Then we cut back every other tooth with a circular cutter which forms the cuts at 183 and 184 (best shown in Figs. 10 and 11) thereby forming the short teeth 181, 181'. The chamfers 182 are then formed.

A blocker ring 185 (Figs. 1, 2 and 5) lies between the gears 109 and 90 and comprises a friction cup clutching surface 186 which may be formed as a fine thread, preferably of left hand and in the neighborhood of forty threads per inch as disclosed in the aforesaid Fishburn application, or plain if desired, to engage the surface of cone 111 to obtain the blocker action. The surface 186 is carried by an inner ring part 187 of bronze or the like which fits within an outer ring part 188. Part 187 has a forward outwardly extending shoulder 189 which seats within a counterbore of the part 188. At the rear the part 188 has a series of notches 190 (Fig. 2) into which a portion of the part 187 is forced to lock the parts together by staking at 191 prior to machining the ring 185. The part 188 is formed at its forward end with upstanding blocker teeth 192. The trailing portions of the faces of teeth 192 which are presented toward the forward ends of the teeth of sleeve F may be bevelled at 193 to facilitate clutching of sleeve F to start a dead engine by towing the car, as will be presently more apparent. Where the bevels 193 are employed, we have determined that a 7° angle of the bevel provides the desired result without interfering with the normal functioning of the parts. The blocker ring 185 rotates with the driven shaft 93 and sleeve F with relative rotation accommodated so that blocker teeth 192 may move between the drive blocking position of Fig. 7 and the coast blocking position of Fig. 12.

The blocker ring drive is provided by a plurality of upstanding lugs 194 formed as a part of ring 185. Ordinarily two lugs are sufficient, disposed at diametrically opposite points. The forward edge of the driven gear extension 177 is cut or notched at 195 to receive a lug 194 with sufficient clearance circumferentially to allow the blocker teeth 192 to rotate relative to the sleeve teeth within the aforesaid limits. A relatively light spring 196 may be provided between the gear 109 and blocker ring 185 to urge the blocker surface lightly into frictional energizing engagement with cone 111 so that the blocker ring tends to rotate with driving shaft 83 thereby placing the blocker ring in one of its two blocking positions prior to forward shift of sleeve F whenever gears 90 and 109 are asynchronous.

From the foregoing it will be apparent that whenever the speeds of shaft 83 and gear 109 are different from each other, the blocker ring 185 will move into position to block forward shift of sleeve F. In Fig. 6, the sleeve F is in its disengaged rearward position, the blocker ring tending to lead the driven gear 109 and sleeve F which is the condition when the gear 109 is rotating slower than the driving shaft and when the sleeve is not urged forwardly. When gear 109 rotates faster than the driving shaft, as when the engine coasts, then the friction drag at cone 111 drags the blocker ring rotatably backwards (counterclockwise looking front to rear) with the driving shaft until the lugs 194 engage the ends of slots 195 opposite to the end engaged in the Fig. 6 showing. At this time the blocker teeth are at their positions shown in Fig. 12 ready to block the long sleeve teeth 180, 180'. In either instance forward clutching shift of sleeve F is blocked by the blocker teeth 192.

The arrangement is such that the sleeve will not shift forwardly of the blocker teeth 192 except when the engine is allowed to coast from a previous condition of drive. Therefore, whenever the engine is driving the car and the sleeve F shifts forwardly, the sleeve will be blocked against ratcheting with teeth 110. Furthermore, clutching of sleeve F is limited to coasting down of the engine to synchronism with teeth 110 from a condition where the engine and teeth 110 were rotating faster than the sleeve F and gear 109.

In order to pilot the sleeve F against tilting or tendency to bind as it shifts forwardly to reach the teeth 110, we have provided the aforesaid pilot ribs or lands 179 which slidably support the sleeve at the bridged portion of teeth 180', 181'. The sleeve is thus piloted independently of teeth 178 which is of advantage because necessary tooth-backlash would prevent a close piloting of the sleeve on the teeth 178 alone. With our improved arrangement the sleeve F shifts more freely and has a tendency to fully clutch with teeth 110 during engine coast.

The means for urging sleeve F forwardly will be presently described. However, let us assume at this time that a force is to be applied forwardly to sleeve F while the sleeve is in the Fig. 6 position of release and while the engine is driving the car in a reduction drive ratio, as when the driving shaft 83 is rotating forwardly faster than gear 109 and sleeve F. Under such conditions the blocker ring 185 will lead sleeve F and the blocker teeth 192 and lugs 194 will be positioned as in Fig. 6. Now as a force is applied to move the sleeve F forwardly, the teeth 181, 181' will strike teeth 192 and further shift of the sleeve will be blocked as long as the engine continues to drive in this drive blocking relationship. This condition is shown in Fig. 7 which may be said to represent an intermediate or blocked position of the sleeve at the time that the sleeve is rotating slower than gear 90. If now the accelerator pedal is released to allow the engine to coast, while gear 109 continues to freely rotate, the shaft 83 and blocker 185 will rapidly slow down together until they synchronize with gear 109. Then, as the shaft 83 starts to drop just slightly below the speed of gear 109, the blocker 185 will lag the sleeve F by an amount equal to half the total travel of lugs 194 which total travel is from the Fig. 6 position to the Fig. 12 position. The half travel is indicated by the position of lugs 194 in Fig. 8. This is necessarily so because of the long teeth 180, 180' the forward ends of which (Fig. 7) axially overlap the blocker teeth 192 so that the blocker lags the sleeve only until these teeth 180, 180' strike the sides of the blocker teeth at this approximately synchronized condition between the shaft 83 and gear 109. As soon as this condition is reached (Fig. 8) the sleeve F moves forwardly so that the blocker teeth 192 pass between adjacent teeth 180, 181' and 180', 181 and the long teeth 180, 180' will strike the ends of teeth 110 and then glance off these teeth assisted by the bevels 182. As the long teeth glance off the teeth 110, the engine coasts down slightly more until the long teeth, now thrust forwardly between teeth 110, strike against the sides of teeth 110 and at this time the engine cannot coast down any more relative to gear 109. Any continued coast of the engine will simply serve as a brake on the car travel or in other words the engine cannot then slow down except as permitted by the car slowing down with it. At this time the sleeve will often move fully forward to its Fig. 9 fully clutched positions, especially when our piloting means 179 (Fig. 4) is employed to guide the sleeve F or when a force is applied to the sleeve F which is adequate to compel full clutching of the sleeve during engine coast as aforesaid. If however the structural relationship and the forces involved are such that full clutching does not result during engine coast, then a partial or primary clutching will nevertheless result and it is just as positive as a full clutching to prevent the engine turning slower or faster than gear 109. Under such conditions, which sometimes even occur interchangeably with full clutching on coast, the secondary full clutching will automatically occur just as soon as the engine is accelerated to cause a reversal of the torque between the teeth of sleeve F and teeth 110. At the instant that the teeth are unloaded the sleeve will shift forwardly to the limit of its clutching travel. The long teeth will in any event insure clutching on coast between the sleeve F and gear 90 at approximately a condition of synchronism between these parts.

Now let us assume that the force applied forwardly to sleeve F occurs at a time when the blocker lags the sleeve. Under such conditions the teeth 180, 180' will almost immediately engage blocker teeth 192 (Fig. 12) and the sleeve will be blocked in what may be called the coast blocking condition, Fig. 7 representing the drive blocking condition. The low cam angle at 193 will not be sufficient to cam the blocker forwards against the thrust at friction surfaces 111, 186 and, as the main clutch is engaged, the driving shaft 83 continues to rotate at the assumed speed less than that of the sleeve F and the gear 109. (The main function of the cammed surfaces 193, when the cams are employed, will presently be apparent in conjunction with getting a dead engine started by towing the car.) Now, with the sleeve teeth 180, 180' blocked by the blocker teeth as when the engine is coasting, let us assume that the engine is speeded up by the car driver depressing the accelerator pedal in the usual manner. This will cause the blocker to immediately rotate ahead of the sleeve until lugs 194 engage the leading ends of slots 195 and the sleeve will move forwardly until the parts are positioned as in Fig. 7 with teeth 181, 181' blocked by teeth 192. One function of the short teeth 181, 181' relative to long teeth 180, 180' will now be apparent because when the driver depresses the accelerator pedal to cause the blocker to move ahead of the sleeve F, teeth 192 slide off the ends of teeth 180, 180' but the blocker teeth do not have time to enter the spaces between teeth 180, 181' and 180', 181 because of the forward rotation of the blocker and the cut-back arrangement of sleeve teeth. The blocker teeth therefore jump these spaces and block teeth 181, 181' which are made sufficiently shorter than teeth 180, 180' to insure this action. When the parts assume the Fig. 7 positions, which is the drive blocking condition, then on slowing down the engine, as when the driver releases the accelerator pedal, the clutching of sleeve F with teeth 110 will occur during the coast just as in the foregoing example of a typical clutching of the sleeve.

The automatic control for shifting sleeve F is fully shown in our aforesaid parent application. This sleeve has a shifting groove 197 engaged by a yoke 198 (Figs. 1 and 3) which is secured to a transversely extending rock shaft 199 to which is fixed the operating lever 200 which extends downwardly outside of the transmission casing 89. A link 201 (Fig. 1) connects the lower end of lever 200 with the rear end of a follower rod 202 of the power operating means preferably in the form of a pressure fluid motor J (Fig. 1) Our arrangement is such that the sleeve F is operated forwardly in its clutching shift by the action of the pressure fluid which acts through the medium of a spring such that the motor may operate ahead of the sleeve clutching and such that only a predetermined shifting force is applied to sleeve F thereby protecting the teeth against damage and insuring uniform conditions of operation for the sleeve. Sleeve F is shifted back to its Fig. 1 position by a release spring of suitable type and incorporated in motor J.

This releasing movement of the sleeve is limited by engagement thereof with the side of gear 109 (Fig. 5).

The forward clutching movement of sleeve F is limited by a stop pin 226 carried by the casing 89 and having its rear end in the path of yoke 198 (Figs. 1 and 3).

The operation of the power transmission is as follows:

With the car parked, the transmission D will of course be in neutral, with the manually shiftable sleeve H and the automatically shiftable sleeve F positioned as in Fig. 1.

To start in the lowest or slowest driving speed ratio, ordinarily called first, the driver depresses the clutch pedal to release the main clutch and then shifts the manual sleeve H rearwardly for blocker synchronizing clutching with the teeth 115 of the low speed gear 114. This shift is facilitated by release of the main clutch thereby disconnecting the pinion 90 from the engine.

The driver then engages the main clutch while depressing the accelerator pedal to start the car in first. The drive in first is obtained as follows: Pinion 90 drives gear 96 which causes engagement of overrunning clutch G to drive countershaft 97, gear 107 driving gear 114 whence the drive passes through sleeve H and hub 120 to the output shaft 93.

As set forth in detail in our aforesaid parent application, the sleeve F is preferably arranged to be biased toward its clutching and released positions in response to predetermined vehicle speeds although such speed control does not in itself form a part of this application and has therefore been omitted. However, as the operation of sleeve F in relationship with coast and drive functions of shaft 83 is best illustrated by reference to speed control functions for the motor J, it is assumed that a suitable governor control driven at 250 from countershaft gear 249 is provided for controlling motor J.

The drive in first is a free-wheeling drive below a predetermined car speed, the driven shaft 93 being free to overrun the driving shaft 83 by automatic release of the overrunning clutch G.

When the car is driven above the aforesaid predetermined speed in first, this being the normal operation of the car, upon release of the accelerator pedal then sleeve F will shift to clutch with teeth 110 when these teeth are allowed to coast down to synchronize with the speed of sleeve F as aforesaid to step-up the drive from first to second.

While the car is being driven under the foregoing conditions above the aforesaid predetermined speed in first, the shift from first to second is automatic and operates in response to driver release of the accelerator pedal sufficiently to slow down the engine speed to the point where the blocker 185 will release the sleeve F. This is most conveniently accomplished by simply letting up on the accelerator pedal whereupon the speed of the engine quickly drops while the car maintains its speed by reason of overrun at clutch G. As the pinion 90 drops to the speed of gear 109, the sleeve F, while urged forwardly by the engaging spring of the motor J, begins to rotate ahead of the speed of the blocker 185 which is rotating at the speed of gear 90, and the sides of teeth 180, 180' then strike against the blocker teeth 192 (Fig. 8) to align the blocker teeth with the spaces between teeth 180, 181' and 180', 181 whereupon the sleeve will shift forwardly without shock or jar to clutch with the teeth 110 during coast (Fig. 9) and thereby clutch the driving shaft 83 with gear 109 for the second speed drive faster than the aforesaid drive in first. The pilot lands 179 (Fig. 4) center and guide the sleeve F against binding on the teeth 178 during forward shift of the sleeve in order to facilitate the clutching of the sleeve with teeth 110 during coast. However, in the event that the sleeve only partially completes its clutching engagement with teeth 110 during coast, then in such event the sleeve F will fully shift forwardly to the Fig. 9 position at the instant that the driving shaft is next speeded up. Sleeve F therefore clutches during coast and under pretermined pressure of the aforesaid engaging spring which cushions the clutching and greatly increases the life of the clutch teeth.

The drive in second passes from pinion 90 through sleeve F to gear 109 thence to gear 106, countershaft 97, gears 107 and 114, sleeve H, hub 120 and the driven shaft 93. This drive is a two-way drive, clutch G overrunning. The engine is used as a brake during coast in the second speed ratio, the car driving the engine at approximately twice the speed of the driven shaft 93 for the particular gear sizes illustrated.

When the car is brought to a stop in the second or fourth speeds, the sleeve F is automatically disengaged under control of the governor action and preferably with some form of torque relief to unload the sleeve F and thereby facilitate the disengaging action as set forth in the aforesaid parent application. This arrangement provides automatic step-down in the transmission in response to stopping the car so that the driver on subsequently depressing the accelerator for accelerating the car will have the benefit of a favorable torque multiplication in the transmission by automatically shifting back to either third or first depending on the setting of the clutch H.

In order to start the car in the high range the driver depresses clutch pedal to release the main clutch and he then moves the manual shift sleeve H forwardly under blocker synchronizing shift to clutch with teeth 112 of gear 109 whereby this gear is directly drivingly connected with driven shaft 93 through sleeve H and hub 120. The driver then releases the clutch pedal and depresses the accelerator pedal to drive the car in the third speed ratio. The drive in third takes place from the main pinion 90 to gear 96 thence through the overrunning clutch clutch G and through gears 106, 109 and directly out to the driven shaft 93.

The driver shifts the sleeve H to the high range position when the car is travelling at relatively high speed in second, then the shift will be made to direct, skipping third.

The shift from third to direct is automatic and similar to the shift from first to second and is obtained by releasing the accelerator pedal momentarily while driving the car above the speed at which sleeve F is biased forwardly under control of motor J. At the synchronizing point, the blocker 185 will allow the sleeve F to clutch with teeth 110 under the force of the engaging spring as before.

In order to drive the car in reverse, the driver releases the main clutch and shifts the reverse idler gear with the gears 108 and 119. This reverse drive passes from pinion 90 to gear 96, then through overrunning clutch G and gear 108, the reverse idler gear, and gear 119 to the driven shaft 93. The reverse drive is therefore a free wheeling drive and a step-up in reverse is obtained without free wheeling by releasing the accelerator pedal to engage sleeve F. Such a drive passes through the following parts: pinion 90 through sleeve F to gear 109 thence to gear 106 and through the reverse gear set to the driven shaft 93.

We claim:

1. In a motor vehicle drive having a rotatable driving structure adapted to receive drive from the engine and a rotatable driven structure adapted to transmit drive from the driving structure for driving the vehicle, teeth drivingly connected to one of said structures, a shiftable clutching member carrying a set of teeth adapted to positively clutchingly engage the teeth of said one structure, the shiftable teeth comprising a plurality of circumferentially spaced pairs of blocker-engaging teeth, one tooth of each pair extending axially beyond the other tooth of such pair in the direction of clutching shift of said clutching member thereby defining relatively long and short teeth respectively, a blocker member carrying a set of blocker teeth each tooth thereof being adapted for blocking engagement with said blocker-engaging teeth of the shiftable member, means drivingly connecting one of said sets of teeth with the other of said structures, means drivingly connecting said sets of teeth together with rotative clearance to accommodate limited relative rotation therebetween, means for causing said one of said sets of teeth to rotatably lead the other of said sets of teeth when the driving structure rotates faster than the driven structure and to rotatably lag said other set of teeth when the driving structure tends to rotate slower than the driven structure, the blocker teeth being so arranged with respect to the pairs of blocker-engaging teeth that when the said leading-and-lagging sets of teeth leads or lags the other of said sets of teeth as aforesaid each of the blocker teeth will lie in the path of shift of the relatively short and long teeth respectively of each of said pairs of blocker-engaging teeth, means for urging clutching shift of said shiftable clutching member, the pairs of blocker-engaging teeth being of such relatively different lengths as aforesaid such that when the driving structure coast down from a speed faster than that of the driven structure while the shift means urges clutching shift of said clutching member the blocker member will rotate relative to the shiftable member until the blocker teeth engage the sides respectively of the axially extending portions of the relatively long teeth of said pairs to accommodate clutching shift of said clutching member into engagement with the teeth of said one structure accompanied by passage of the blocker teeth relatively between the pairs of blocker-engaging teeth respectively and such that when the driving structure speeds up from a condition tending to rotate slower than the driven structure while the shift means urges clutching shift of said clutching member the blocker member will rotate relative to the shiftable member to disengage the blocker teeth from the relatively long teeth of said pairs and engage the relatively short teeth of said pairs thereby maintaining the clutching member blocked against engagement with the teeth of said one structure, the teeth of at least one of said pairs of blocker engaging teeth being bridged to provide an abutment adapted for engagement with a tooth of said one structure during the aforesaid clutching shift of said clutching member.

2. In a motor vehicle drive having a rotatable driving structure adapted to receive drive from the engine and a rotatable driven structure adapted to transmit drive from the driving structure for driving the vehicle, a first set of teeth carried by one of said structures, a second set of teeth carried by the other of said structures, a third set of teeth, means drivingly connecting the first and third sets of teeth together to accommodate limited rotation relatively therebetween, means for mounting one of said first and third sets of teeth for shifting movement relative to the other to positively engage the second set of teeth, the shiftable set of teeth comprising a plurality of pairs of teeth adapted to be blocked by the other of said first and third sets of teeth, one tooth of each pair extending axially beyond the other tooth of such pair in the direction of said shifting movement thereby defining relatively long and short teeth respectively, each of the blocking teeth being so constructed and arranged as to block one of the pairs of shiftable teeth against said shifting movement when the first set of teeth rotatably leads or lags the third set of teeth within the limits provided by said driving connecting means while accommodating said shift of the shiftable teeth during change in the relative rotation between the first and third sets of teeth, means acting to maintain the first and third sets of teeth in said blocking relationship when the driving structure rotates faster than the driven structure and when the driven structure is allowed to coast, the pairs of blocked teeth being of such relatively different lengths as aforesaid such that when the driving structure coasts down from a speed faster than that of the driven structure while the shiftable teeth are urged in the direction of the aforesaid shifting movement the blocking teeth will rotate relative to the blocked teeth until the blocking teeth engage the sides respectively of the axially extending portions of the relatively long teeth of said pairs to accommodate clutching shift of the shiftable teeth into engagement with said second set of teeth accompanied by passage of the blocking teeth relatively between the pairs of blocked teeth respectively and such that when the driving structure speeds up from coast as aforesaid to a speed faster than that of the driven structure while the shiftable teeth are urged in the direction of the aforesaid shifting movement the blocking teeth will rotate relative to the blocked teeth to disengage the blocking teeth from the relatively long teeth of said pairs and engage the relatively short teeth of said pairs thereby maintaining the shiftable teeth blocked against engagement with said second set of teeth, the teeth of at least one of said pairs of blocked teeth being bridged to provide an abutment adapted for engagement with a tooth of said second set during the aforesaid clutching shift of said shiftable teeth.

3. In a motor vehicle drive; co-acting relatively rotatable coaxial power transmitting structures one having clutch teeth positively driven therewith; two sets of teeth driven from the other of said structures and rotatably connected together with clearance to accommodate their limited relative rotation between predetermined positions of relatively blocking relationship; one of said sets of teeth being shiftable relative to the other to engage said clutch teeth under blocking control of the other of said sets of teeth; means comprising a connection between one of said structures and one of said sets of teeth operable to relatively rotate said sets of teeth between said positions of blocking relationship when one of said structures tends to exceed or drop below the speed of the other; one of said sets of teeth comprising a plurality of pairs of teeth, the teeth of each pair having adjacent end portions selectively engageable with a tooth of the other of said sets when said sets of teeth are relatively rotated in said positions of blocking relationship, the end portions of the teeth of each of said pairs of teeth being so spaced from each other in the direction of the axis of rotation of said structures as to unblock the shiftable teeth when one of said structures coasts down to approximately the speed of the other while maintaining the shiftable teeth blocked when this said one structure speeds up to and above the speed of this said other structure, the teeth of at least one of said pairs being bridged to provide an abutment adapted for engagement with one of said clutch teeth incident to engagement of said shiftable teeth with said clutch teeth.

4. In a motor vehicle drive; coaxial relatively rotatable driving and driven power transmitting structures; clutch teeth positively driven with one of said structures; two sets of teeth rotatably connected together with clearance to accommodate their limited relative rotation between predetermined positions of relatively blocking relationship, one of said sets of teeth being positively driven with the other of said structures and shiftable relative thereto to engage said clutch teeth, the other of said sets of teeth having a carrier therefor frictionally engageable with said one structure to cause relative rotation of said sets of teeth between said positions of blocking relationship when the driving structure tends to exceed or drop below the speed of the driven structure; one of said sets of teeth comprising a plurality of pairs of teeth, the teeth of each pair having adjacent end portions selectively engageable with a tooth of the other of said sets when said sets of teeth are relatively rotated in said positions of blocking relationship, the end portions of the teeth of each of said pairs of teeth being so spaced from each other in the direction of the axis of rotation of said structures as to unblock the shiftable teeth when one of said structures coasts down to approximately the speed of the other while maintaining the shiftable teeth blocked when this said one structure speeds up to and above the speed of this said other structure, at least one of said pairs of teeth being bridged to provide an abutment engageable with one of said clutch teeth.

5. In a clutching mechanism, driving and driven structures to be clutched, a set of clutch teeth carried by one of said structures, the other of said structures having external teeth and a plurality of radially projecting guide lands respectively disposed between adjacent pairs of the external teeth, and a shiftable clutching sleeve having internal teeth slidably engaging said external teeth and adapted to clutch with said set of clutch teeth, said shiftable sleeve having a plurality of bearing portions respectively slidably engaging said guide lands thereby to center the sleeve on said other structure.

CARL A. NERACHER.
WILLIAM T. DUNN.
TENO IAVELLI.
AUGUSTIN J. SYROVY.